United States Patent [19]

Antes

[11] Patent Number: 4,568,141
[45] Date of Patent: Feb. 4, 1986

[54] DOCUMENT HAVING AN OPTICAL-DIFFRACTION AUTHENTICATING ELEMENT

[75] Inventor: Gregor Antes, Zurich, Switzerland

[73] Assignee: LGZ Landis & Gyr Zug AG, Zug, Switzerland

[21] Appl. No.: 534,201

[22] Filed: Sep. 21, 1983

[30] Foreign Application Priority Data

Oct. 4, 1982 [CH] Switzerland ............ 5820/82

[51] Int. Cl.$^4$ ............ G02B 5/18; G02B 5/32; B42D 15/02; B44F 1/12
[52] U.S. Cl. ............ 350/3.61; 350/162.23; 283/91; 283/904; 428/30
[58] Field of Search ............ 350/3.61, 3.6, 3.78, 350/3.79, 162.17, 162.18, 162.19, 162.2, 162.23, 162.24, 162.11, 6.1, 6.3, 6.5, 6.9, 3.75, 3.7, 3.72, 3.73; 283/86, 91, 904; 428/30, 916

[56] References Cited

U.S. PATENT DOCUMENTS 1,996,539  4/1935  Dufay .
3,412,493  11/1968  French .
4,094,575  6/1978  Kellie .
4,119,361  10/1978  Greenaway .
4,129,382  12/1978  Greenaway .
4,184,700  1/1980  Greenaway .

FOREIGN PATENT DOCUMENTS 2093404  9/1982  United Kingdom .

*Primary Examiner*—John K. Corbin
*Assistant Examiner*—Bruce S. Shapiro
*Attorney, Agent, or Firm*—Marmorek, Guttman & Rubenstein

[57] ABSTRACT

A document includes a substrate which has an outer surface and defines a plane, and a coordinate system which is defined with respect to the plane. A diffraction-optical authenticating element covers at least part of the outer surface, and generates at least one color pattern constituting a visually testable feature which verifies the authenticity of the document. The diffraction-optical authenticating element provides a color pattern moving at a predetermined velocity along a predetermined track when the document is illuminated from a first direction and viewed from a second direction, as defined with respect to the coordinate system, upon the document being rotated within the plane along a prearranged sense of rotation, and at a prearranged velocity.

7 Claims, 7 Drawing Figures

DOCUMENT HAVING AN OPTICAL-DIFFRACTION AUTHENTICATING ELEMENT

BACKGROUND OF THE INVENTION

Unconventional optical diffraction type authenticating elements are used to prove the authenticity or genuineness of documents such as bank notes, checks, and identity cards. Such optical-diffraction type authenticating elements usually contain a visually observable feature which serves to verify the genuineness or authenticity of a document. Optical diffraction type authenticating elements preferably have the following features:

1. Such an element is to show a well-defined and conspicuous optical effect under different illumination and viewing-conditions occurring in every-day use.
2. It must be capable of being mass-produced economically, but requiring a great expenditure in investment and know-how.
3. It should not be similar to any known optical-diffraction patterns.
4. It should not be capable of being manufactured from, or simulating any commercially available optical-diffraction patterns.
5. It should offer the possibility of being manufactured in numerous variants, so that it can be used in numerous variations specifically in various types of documents, currencies, and values.
6. It should have adequate durability with respect to being crumpled.

There is known from U.S. Pat. No. 4,181,700 a document which includes an authenticating element in the form of an optical diffraction grating. The authenticating element covers at least a portion of a substrate, and includes a diffraction structure in the form of a phase diffraction grating or phase hologram, which generates at least one color pattern due to diffraction of light impinging thereon. The color pattern constitutes a visually testable feature of genuineness. It is characteristic for such diffraction structures that even a small change of the viewing direction, or of the direction of illumination results in a significant change of the reflected color. For example a diffraction grating having a spatial frequency of 1000 lines/mm yields a green color when white light is incident at an angle of 30 degrees, and when the document is viewed at right angles to its plane, while a red color is produced when the light is incident at an angle of 41 degrees. In practice the document is frequently illuminated by light sources having a broad spectrum, for example one or more lamps, or sunlight, passing through a window. Hence, as a result of the superposition of several spectral regions and orders of diffraction almost any arbitrary patterns of color mixture arise. These patterns are not only difficult to define, but also change in a manner which cannot be simply described, if, for example, the direction of illumination or viewing is changed by tilting of the document. If the substrate of the document is not completely even, for example as a result of crumpling, then the diffraction structure has surface facets having different and nondefinite angles of inclination. Such surface facets result in nondefinable color effects during static viewing of the diffraction structure. Hence requirements 1 through 6 are not met simultaneously.

From U.S. Pat. No. 3,412,493 there is known the employment of a diffraction structure which yields a diffraction pattern of concentric circles, or a complicated diffraction pattern of arbitrary light diffraction figures. The above-noted deficiencies arise here also.

From British Pat. No. 2,093,404 there is known an authenticating device, whose diffraction structure consists of a first diffraction grating region in the form of a circle, and of a second diffraction grating region in the form of a rectangle, and wherein the rectangle encloses the circle. A viewer sees these two regions in contrasting colors, or color spectra, in dependence of the respective illuminating conditions or viewing directions. This reference does not meet conditions 1–6 previously enumerated either.

Finally, from U.S. Pat. No. 1,996,539, there is known an embossment pattern for decorative purposes, which consists of a multiplicity of individual pattern elements, and wherein the orientation of the pattern elements along a carrier is progressively varied. The line spacing of the embossment patterns is of the order of magnitude from about 1/30 mm to about 1 mm, so that any formation of diffraction color effects is expressly avoided. Such embossment patterns are therefore not suitable either to be employed as authenticating elements in documents, since they do not meet requirements 1–6.

SUMMARY OF THE INVENTION

The present invention is an optical diffraction type element for authenticating a document. The authenticity element comprises a diffraction structure mounted on the document for diffracting incident light. Typically, the diffraction structure comprises a plurality of adjoining, periodically lined, diffraction grating regions, the lines in adjoining regions having different orientations and defining different grating constants. The diffraction structure is capable of producing one or more color patterns as a result of the diffraction of incident light. When the document is rotated about an axis perpendicular to its plane, the color patterns appear to move along predetermined tracks. The movement of the color patterns along the predetermined tracks when the document is rotating constitutes a visually observable feature for testing the authenticity of the document. This authenticity testing feature is observable under a variety of illumination and viewing conditions.

BRIEF DESCRIPTION OF THE DRAWINGS

For a fuller understanding of the objects of the invention reference should be had to the following detailed description, in connection with the accompanying drawings, in which.

DESCRIPTION OF THE PREFERRED EMBODIMENTS

Figure 1:
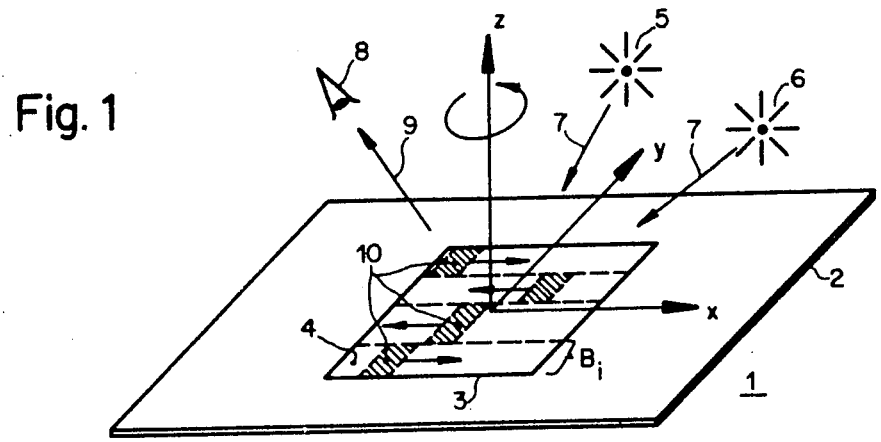
FIG. 1 is a perspective view of a document.

Referring now to the drawings, a document 1 in FIG. 1 may, for example, be a banknote, a check, an identity card, or the like, which consists of a substrate 2 of paper, cardboard, or synthetic material, as well as of an optical diffraction authenticating element 3. The authenticating element 3 is disposed on at least a part of the surface of the substrate, and includes a diffraction structure 4. The diffraction structure 4 is advantageously generated by stamping of a phase-diffraction embossment pattern into the substrate 2, or into a thin layer of synthetic material of the substrate 2, and wherein the thin layer is provided with a metallic reflective coating. But an amplitude hologram, to be viewed as a transparency, or by reflection, can also serve as a diffraction structure. Methods for generating diffraction structures in a document are known, and will therefore not be explained further. In the example illustrated the diffraction structure 4 represents a reflection phase-hologram.

During visual testing for genuineness of the document 1, is authenticating element 3 is viewed in e.g. a polychromatic light. In FIG. 1 two light sources 5 and 6 are shown, which illuminate the document 1 along arbitrary but fixed directions of illumination 7. The eye of an observer 8 also views the authenticating elements 3 along an arbitrary, but fixed direction of viewing 9. The diffraction structure 4 generates several color patterns 10 as a result of the incident light; the color patterns 10 are shown by shaded rectangles in FIG. 1, and represent a possible test of genuineness, which can be visually examined. However, the spatial position and the characteristic properties of the color patterns 10 depend strongly on the direction of incident illumination 7, and the direction of viewing 9. The test of genuineness, contrary to the state-of-the-art, does not therefore reside in the fact that a certain color pattern results, based on predefined viewing- and illuminating conditions. The test of genuineness rather resides in the fact that the color patterns 10 appear to move in a predetermined direction along the predefined tracks $B_i$, if the substrate 2 is rotated in its plane in a certain direction of rotation, and at a certain velocity about an axis perpendicular to the substrate. Typically the axis passes approximately through the center of the authenticating element 3. The exemplified directions of movement of the color patterns 10 have been shown in FIG. 1 by arrows. Preferably, the tracks $B_i$ are fixed with respect to the coordinate system x,y.

While the respective color patterns 10 viewed by an observer 8 are determined by the particular kind of diffraction structure 4, and furthermore by the direction of viewing 9, and the geometry of illumination, the direction of movement, and the velocity of movement of the color patterns 10 within the tracks $B_i$ have a predetermined relation to the direction of rotation, as well as to the rotation velocity of the substrate 2, and are largely independent of the respective illumination conditions, and observation conditions, which would be difficult to define. Movement of the color patterns 10 along the tracks of movement $B_i$ therefore results in a well defined optical effect under most varying observation and viewing-conditions, even when the substrate 2 is not completely smooth. This effect is conspicuous even to a layman, and can be easily verified.

Numerous possibilities exist for the graphic form of the movement tracks $B_i$. The tracks $B_i$ may be linear, circular, annular, or irregular. Furthermore, the movement tracks $B_i$ may be endless, continuous or discontinuous. The local variation of movement of the moving color patterns 10 relative to the velocity of rotation of the substrate 2 may be varied. Depending on the particular type of the diffraction structure 4 the movement of the color pattern 10 within the movement tracks $B_i$ may be continuous, quasi-continuous, or jump-like. The color patterns 10 disposed in a ring-shaped track may, for example, rotate more quickly, or more slowly than the rotation of the substrate 2 within its plane, and the color patterns 10 may rotate with respect to the rotation of the substrate 2 either in the same sense, or in an opposite sense.

Here the case is to be excluded, however, wherein the color pattern 10 rotates continuously in a circular track at the same velocity as that of the substrate 2, but in an opposite sense of rotation. This would mean that although the color pattern 10 is rotating with respect to the coordinate system x,y, it is not rotating with respect to a stationary coordinate system, which could alternately be realized by a diffraction structure consisting of concentric rings, so that conditions 2 through 5 would not be fulfilled.

Figure 2:
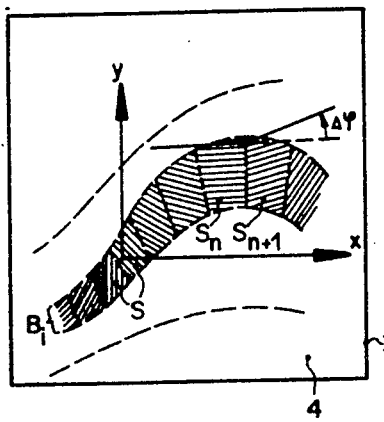
FIG. 2 is a plan view of an authenticating element.
Figure 4:
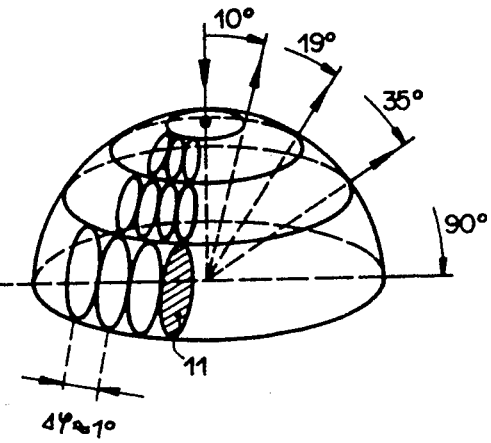
FIG. 4 is a second schematic representation of various directions of diffraction within a semi-spherical space.
Figure 3:
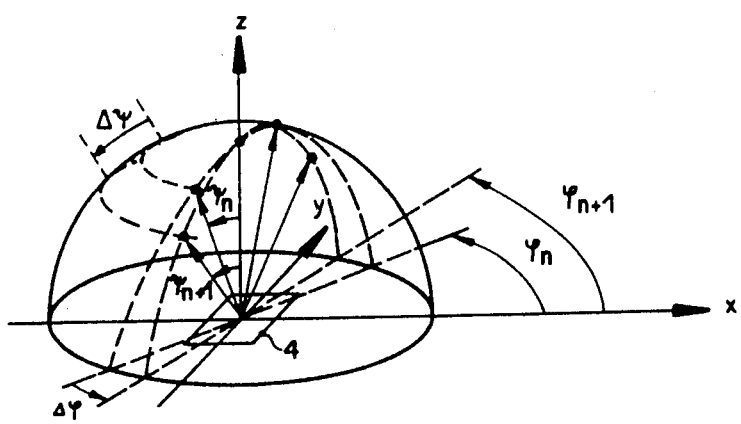
FIG. 3 is a first schematic representation of various directions of diffraction within a semi-spherical space.

Understanding of the invention will be further enhanced with the aid of FIGS. 2 and 3. In FIG. 2 there is shown an authenticating element 3a, a portion of a surface thereof being denoted as a moving track $B_i$. The diffraction structure 4 consists of a multiplicity of individual structural elements S, which are arranged in a row free of any gaps along the surface portion covered by the track $B_i$. The color pattern patterns 10 such as shown in FIG. 1 move along the tracks $B_i$ which comprise the individual structural element $S_n$, $S_{n+1}$, . . . . The individual structural elements appear to light up in sequence to an observer. The diffraction properties of the structural elements S are characterized so that, for example, any visible light having a wavelength λ, which is incident perpendicularly to the structural element $S_n$ would, according to FIG. 3, be diffracted along the direction defined by the angles $\phi_n$, and $\Psi_n$, as well along the direction $\phi_n+180°$ and, $\Psi_n$, (conjugated diffraction order). The neighboring element $S_{n+1}$ would diffract the incident light along the direction $\phi_{n+1}$, $\Psi_{n+1}$, as well as along the direction $\phi_{n+1}+180°$, $\Psi_{n+1}$. Here the angular difference $\Delta\phi$ is given by the different respective orientations of the structural elements $S_n$ and $S_{n+1}$, while the angular difference $\Delta\Psi$ is given by the different respective spatial frequencies of those two structural elements. As shown in FIG. 4, the angle $\phi$ is the angle between the X axis and the projection of the viewing direction on the x,y plane. The angle $\Psi$ is the angle between the viewing direction and the Z axis.

If, on the other hand, the diffraction structure 4 is, for example, illuminated by means of white light in a direction along the direction $\phi_n$, $\Psi_n$, then the structural element $S_n$ appears to be luminescent to the eye of an observer, when viewing in a vertical direction (axis z in FIG. 3), which is due to the spectral dispersion of the diffraction structure 4 in a color corresponding to the wavelength λ. If the diffraction directions of different structural elements of the movement track $B_i$ are angularly spaced sufficiently closely next to one another, the diffraction direction fill the entire semi-spherical space above the x,y plane in FIG. 3. Thus, the desired diffraction effects are generally observable at arbitrary directions of illumination and observation.

If the document, with its authenticating element 3a is now rotated in a clockwise sense by an angle Δφ, then the bordering structural element $S_{n+1}$ fulfills the condition of visibility, the structural element $S_{n+2}$ fulfilling the condition of visibility during a further rotation, and so on, so that a quasi-continuous movement of a certain color pattern results.

It will be easily understood that the aforesaid effect arises also when viewing from an inclined angle. In what follows, an estimate will be made of how many different structural elements are needed within a movement track $B_i$, if the diffraction structure should be of such a kind that a color effect is visible in any arbitrary illumination, and in any azimuthal angular position of the document 1, when it is viewed at right angles. It will be assumed here that the substrate 2 is flat, apart from the microscopically fine diffraction structure 4.

The more directional the source of illumination used, the more structural elements S of different respective directions of diffraction are required, so that the condition of visibility for a color effect is met, independent of the average direction of illumination (FIG. 1), and of the position of the document 1. Direct illumination by the sun probably constitutes the most extreme case of any directional illumination, which has to be taken into account in practice in the present connection. The angular degree of blurring corresponding to the apparent diameter of the sun amounts to about plus/minus 0.25 degrees. The aperture of the eye of an observer viewing at a normal distance defines an additional angular region of about plus/minus 0.3 degrees. The result is that a structural element S of a moving track $B_i$ provides a color effect, even if the average direction of illumination 7 deviates by about plus/minus 0.55 degrees in azimuth from an ideal direction. Regarding the angle of incidence with respect to a direction z at right angles to the plane of the document, a considerably greater tolerance exists, as three spatial frequencies in the region from 455 to 1430 lines/mm are adequate, so as to cover the significant region of incident angles from 10° to 90°, which arise in practice. Angles of incidence of less than about 10° are, in case of the assumptions mentioned, not realizable in practice, when viewing the document at right angles, as the silhouette of the observer would obstruct the light source.

If the structural elements S are, for example, diffraction gratings, then the structural elements having a grating constant of 0.7 micrometers (spatial frequency of 1430 lines/mm) cover a region of an angle of incidence, when the substrate is viewed at right angles, and is illuminated by means of white light, from 90 degrees to about 35 degrees, while structural elements having a grating constant of 1.2 micrometers cover a corresponding region from about 19 degrees to 35 degrees, and structural elements having a grating constant of 2.2 micrometers (spatial frequency 455 lines/mm) cover a region from about 10 degrees to 19 degrees.

Using three spatial frequencies, and an angular range Δφ from plus/minus 0.55 degree ≈1 degree, there results the condition shown in FIG. 4. In FIG. 4 the incident angular region which results in a color effect (FIG. 3), when viewing the structural element S at right angles, is denoted by an elliptical surface 11. These surfaces 11 cover the entire unitary semi-sphere in a region from $\Psi=10$ degrees to $\Psi=90$ degrees. If, for the purpose of estimating the number n of required structural elements, one takes into account only the plus-first and the minus-first order of diffraction, then according to the equation $$n_\psi = \frac{360}{2} \cdot \frac{\sin\psi_{max}}{\Delta\phi}$$

the number of required structural elements can be determined for each of the three groups, and wherein $\Psi_{max}$ denotes the largest angle of incidence of a respective group with respect to a direction at right angles to the surface. Based on the above assumptions there result:

$$\begin{aligned} n_{90-35\ deg} &= 180 \\ n_{35-19\ deg} &= 103 \\ n_{19-10\ deg} &= \phantom{0}59 \\ \hline n &= 442 \end{aligned}$$

So as to obtain a good continuity of movement of the color pattern 10, advantageously more than three spatial frequencies, or even so-called spatial frequency continua are used. The orders of diffraction are advantageously arranged on the unitary semi-sphere (FIG. 4) in the form of a helix or double-helix.

While the aforementioned theoretical analysis yields 442 required surface elements, in practice far fewer than the aforesaid estimated 442 structural elements are required for the generation of a quasi-continuous moving color effect. The ideal number of structural elements is determined experimentally based on the desired pattern. One has to take into account that the substrate 2 is not ideally smooth, as a rule, which in turn leads to a broadening of the orders of diffraction. Furthermore, in practice even the higher orders of diffraction lead to a color effect. Finally, one has to take into account the fact that an intraocular parallax of about 10 degrees occurs anyway when the structure is viewed with both eyes. Experiments have shown that about 50 structural elements having uniformly distributed directions of diffraction suffice to obtain an easily viewable, quasi-continuous moving color effect under the most various conditions of illumination.

If a still smaller number of structural elements S are used, or if the directions of diffraction of the structural elements S are distributed non-uniformly, then during rotation of the document 1 an effect of blinking surface elements in a well-defined sequence results within the moving tracks $B_i$.

Based on the aforesaid explanations it will be easily understood that the aforesaid authenticating element 3 or 3a can be implemented in numerous variations. The diffraction structure 4 may be of a kind that at least in the case of viewing the elements at right angles at least one clor pattern 10 is generated at any arbitrary direction of illumination. The structure is advantageously of a type that at least one color pattern 10 is visible during any arbitrary direction of illumination 7 or direction of viewing 9. Advantageously both the direction of diffraction, namely the diffraction-optical orientation of the diffraction structure 4, as well as the spatial frequency thereof vary according to a predetermined law along the track of movement $B_i$. The diffraction structure 4 may consist of a plurality of adjoining discrete structural elements S of different respective diffraction-optical orientations, and/or of different respective spatial frequencies. The diffraction-optical orientation and/or the spatial frequency of the diffraction structure 4 may, however, also vary along the track of movement $B_i$ continuously, so that a completely continuous movement of the color patterns 10 is obtained.

Figure 5:
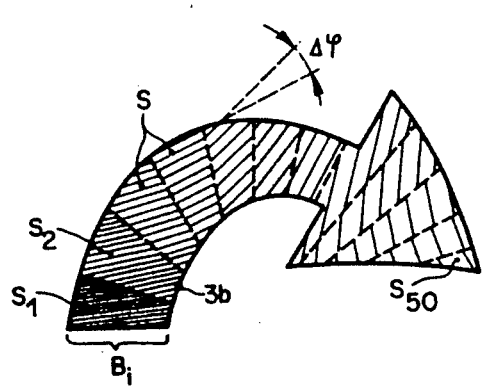
FIG. 5 is a plan view of another version of an authenticating element.

FIG. 5 shows an authenticating element 3b having a single track of movement $B_i$, which has the graphic form of a semi-circular arrow, wherein the effect to be tested for the feature of genuineness, namely the movement of a color pattern along an arrow, is self-explanatory, if the document is rotated in a clockwise sense in the direction of the arrow. As structural elements S of the diffraction structure 4 there serve, for example, n=50 different diffraction gratings. The grating constant of the first structural element $S_1$ is, for example, 2.2 micrometers, and that of the last structural element $S_{50}$ is, for example, about 0.7 micrometers. Along the arrow the grating constant, d, from structural element to structural element is reduced by the amount $$\Delta d = \frac{2.2 - 0.7}{n} \mu m$$

Furthermore, the orientation of structural element $S_n$ with respect to the preceding structural element $S_{n-1}$ is rotated in a counterclockwise sense by the angle $$\Delta\phi = \frac{180°}{n}$$

Figure 6:
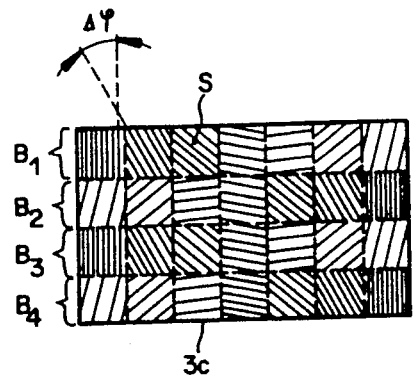
FIG. 6 is a plan view of still another version of an authenticating element.

In FIG. 6 there is shown an authenticating element 3c having four parallel movement tracks $B_1$ to $B_4$. The diffraction structure of the movement tracks $B_1$ and $B_3$ consists of adjoining structural elements S, whose orientation in the drawing changes by a respective angle $\Delta\phi > 0$ from left to right. The diffraction structure of the movement tracks $B_2$ and $B_4$ is similar; however, the orientation of the structural elements S from left to right is changed by the angle $\Delta\phi < 0$. During rotation of the authenticating element 3c the color patterns in adjoining movement tracks move in respective opposite directions. The spatial frequency in adjoining movement tracks can also vary in opposite respective directions, similar to the orientation of the structural element S. As a matter of design choice, a plurality of structural elements having identical properties may be incorporated in a particular diffraction structure. (See for example FIG. 6.).

The structural elements S of a movement track $B_i$ of the aforedescribed authenticating elements 3, 3a, 3b and 3c can also be chosen so as to very small, and can also be spaced next to one another at a high precision, provided a microlithograhic mask technique is used for the manufacture of the original diffraction structure with the aid of a "step-and-repeat" apparatus. The original diffraction structure will then serve as the pattern for mass-production. The technical effort required therefor is so large, that forgeries are, to all extents and purposes, excluded. Reproductions by means of the usual holographic instruments are not possible either, if the structural elements S are chosen to be sufficiently small.

Figure 7:
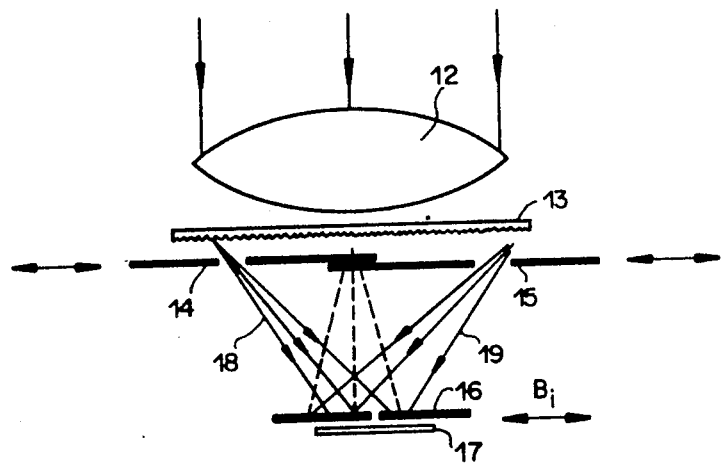
FIG. 7 is a schematic view of a holographic illumination apparatus for generating a diffraction structure.

FIG. 7 shows an illumination apparatus for the generation of an original diffraction structure, which serves as a pattern for mass-production of authenticating elements 3 having a diffraction structure 4, and which results in a completely continuous movement of the color patterns 10. The illumination apparatus consists of a (non-illustrated) laser, a lens 12 of a large format and a large numeric aperture, a light diffusing screen 13, two light stops 14 and 15 disposed immediately behind or downstream of the light diffusing screen 13, and a further light stop 16, which is disposed behind or downstream of the light stops 14 and 15, and immediately upstream of the light-sensitive substrate 17, which is to be illuminated, as seen in the direction of the light rays. The substrate 17 made, for example, of photoresistive material, is small compared to the dimensions of the lens 12. The light stops 14 through 16, implemented, for example as round or circular light stops, are adjustable by means of a motor.

The coherent light generated by the laser is rerouted by the lens 12 in such a manner that it would be focussed on a point of the substrate 17, in the event the light diffusing screen 13 were not present. The light diffusing screen 13 ensures a uniform illumination of the entire surface of the substrate 17. But the path of the rays is limited by the light stops 14 through 16. The light stops 14 and 15, disposed approximately in the same plane limit the angle of incidence of the bundle of light rays 18 and 19 interfering with one another, within the region of the substrate 17. The interference structure, and consequently also the hologram arising on the substrate 17, consequently contain a well-defined spatial frequency region dependent on the magnitude, azimuthal orientation, and respective distances of the light stops 14 and 15.

At least the azimuthal orientation, or the distance between the light stops 14 and 15 is adjustable. The light stop 16 limits the instantaneously illuminated partial surface of the substrate 17, and is continuously positionable in two coordinates relative to the substrate 17 in a predetermined relation with respect to the movement of the light stops 14 and 15.

During illumination the light stop 16 is continuously moved along the movement tracks $B_i$. As the laser, the lens 12, the light diffusing screen 13, and the substrate 17 are mounted rigidly with respect to one another, the interference structure remains stationary despite of the movement of the light stop 16. The light stops 14 and 15 are simultaneously moved towards one another, or away from one another, or rotated in their orientation around the optical axis, so that new spatial frequencies are continuously generated, and existing spatial frequencies are being deleted. The substrate 17 is illuminated within the movement track $B_i$, defined by the movement of the light stop 16, by a cohesive interference pattern, whose spatial frequency varies continuously along the movement track $B_i$ in magnitude and orientation. Following illumination the substrate 17 is processed in the usual manner.

A variant of the apparatus, according to FIG. 7, consists in the two bundles of rays 18 and 19 interfering with one another not being diffused by the light diffusing screen 13, nor varied by the adjustable light stop 15, but being formed by means of a reference ray used in a conventional holographic recording process having a stationary geometry.

I wish it to be understood that I do not desire to be limited to the exact details of construction shown and described, for obvious modifications will occur to a person skilled in the art.

Having thus described the invention, what I claim as new and desire to be secured by Letters Patent is as follows:

1. A document comprising:
    a substrate having an outer surface defining a plane, a diffraction-optical authenticating element covering at least a part of said outer surface and capable of generating at least one color pattern constituting a visually testable feature verifying the authenticity of said document, said diffraction optical authenticating element including a diffraction grating structure which defines a predetermined movement track, said grating structure having a spatial frequency and an angular orientation, at least one of which varies along said track, such that, when said document is illuminated from a first direction and viewed from a second direction and is rotated within said plane, adjacent regions of said diffraction grating structure successively diffract light along said second direction to provide said color pattern which appears to move along said movement track.

2. The document as claimed in claim 1 wherein said diffraction grating structure is capable of generating at least said one color pattern when said document is viewed substantially at a right angle to said plane, said first direction being an arbitrary direction of illumination.

3. The document as claimed in claim 1 wherein said diffraction grating structure comprises at least three discrete diffraction grating regions, each of said regions having a different spatial frequency.

4. The document as claimed in claim 3 wherein the diffraction grating region having the smallest spatial frequency includes at least about 460 lines per millimeter and the diffraction grating region having the largest spatial frequency includes at least 1400 lines per millimeter.

5. The document as claimed in claim 1 wherein said diffraction grating structure includes a multiplicity of adjoining diffraction grating regions, the lines of adjoining diffraction grating regions defining different spatial frequencies and having different angular orientations with respect to one another.

6. The document of claim 1 wherein said diffraction grating structure has a spatial frequency and angular orientation such that at least one of said spatial frequency and angular orientation varies continuously along said track.

7. An authenticating element for use in connection with a document comprising:

a diffraction optical authenticating element covering at least part of a surface of said document and capable of generating at least one color pattern constituting a visually testable feature verifying the authenticity of said document, said diffraction optical authenticating element including a diffraction grating structure which defines a predetermined movement track, said grating structure having a spatial frequency and angular orientation at least one of which varies along said track, such that, when said document is illuminated from a first direction and viewed from a second direction and is rotated within said plane, adjacent regions of said diffraction grating structure successively diffract light along said second direction to provide said color pattern which appears to move along said movement track.

* * * * *